(12) United States Patent
Smith et al.

(10) Patent No.: US 7,739,282 B1
(45) Date of Patent: Jun. 15, 2010

(54) METHOD AND SYSTEM FOR TRACKING CLIENT SOFTWARE USE

(75) Inventors: Ross Faulkner Smith, Bellevue, WA (US); Alex G. Snitkovskiy, Bellevue, WA (US); David Lloyd Hicks, Seattle, WA (US); Cameron Royce Turner, Bellevue, WA (US); Gregory Allen Penoyer, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 1246 days.

(21) Appl. No.: 11/128,979

(22) Filed: May 13, 2005

Related U.S. Application Data (62) Division of application No. 09/982,530, filed on Oct. 18, 2001.

(51) Int. Cl.
*G06F 7/00* (2006.01)
*G06F 17/00* (2006.01)
*G06F 9/44* (2006.01)

(52) U.S. Cl. .................. 707/736; 707/661; 717/124

(58) Field of Classification Search ............... 707/200, 707/2, 3, 4, 661, 665, 667, 670, 708, 713, 707/718, 736
See application file for complete search history.

(56) References Cited

U.S. PATENT DOCUMENTS 6,859,881 B2 * 2/2005 Lortz ......................... 726/23
2001/0047282 A1 * 11/2001 Raveis, Jr. ..................... 705/7
2002/0123966 A1 * 9/2002 Chu et al. ..................... 705/43
2003/0004971 A1 * 1/2003 Gong et al. .................. 707/200
2003/0055835 A1 * 3/2003 Roth .......................... 707/102
2003/0084349 A1 * 5/2003 Friedrichs et al. ........... 713/201
2007/0234426 A1 * 10/2007 Khanolkar et al. ............ 726/23

OTHER PUBLICATIONS

Author: Hilbert et al.; Title: An Approach to Large-Scale Collection of Application Usage Data Over the Internet; Date: 1998; pp. 136-145; Link: http://delivery.acm.org/10.1145/310000/302177/p136-hilbert.pdf?key1=302177&key2=1935478521&coll=GUIDE&dl=GUIDE&CFID=60476147&CFTOKEN=30076383.*

* cited by examiner

*Primary Examiner*—Tony Mahmoudi
*Assistant Examiner*—Md. I Uddin
(74) *Attorney, Agent, or Firm*—Merchant & Gould P.C.

(57) ABSTRACT

A method and system for tracking client software use is disclosed. User data, specifically user interaction with a client-installed software application, is collected in data files and the data files are dynamically uploaded over a global computer system, such as the Internet, to a remote analysis system. The data files are parsed for on-going analysis of feature usage. Typically, for any action that a user performs in the software application, several items are recorded in a data file, such as a user ID, an absolute time-stamp, the method invoked including application source (if the software application includes more than one application), and details such as the dialog invoked, button pressed, menu used, menu item selected, application launch, application termination, as well as environment variables, such as operating system, screen resolution, etc.

17 Claims, 6 Drawing Sheets

METHOD AND SYSTEM FOR TRACKING CLIENT SOFTWARE USE

RELATED APPLICATIONS

This application is a Divisional of U.S. patent application Ser. No. 09/982,530, filed Oct. 18, 2001, which is incorporated by reference herein in its entirety.

TECHNICAL FIELD

The invention generally relates to a method and system for tracking client software use, and more particularly relates to a method and system for saving data related to a user's interaction with a software application and periodically uploading this data automatically for analysis.

BACKGROUND

To improve a software application and make it more user-friendly, developers need to understand how users interact with the application. Traditional methods of understanding a user's behavior while using a software application include user surveys, usability lab studies, and focus groups. However, these methods provide only a limited picture of the overall user experience. Moreover, these methods are often inaccurate and costly for the software developer. There is a need to track actual usage in near real-time so that a realistic view of how a software application is used by real customers may be examined to determine where improvements are necessary.

In the past, specific builds of a software application have been modified with instrumentation code so that user interaction may be recorded into files, these files returned to the software developer and subsequently examined. These special purpose builds would write out to a data file when specific user actions occurred. For example, instrumentation code would be added to the software application so that every time the save function was executed data was written out to a data file. The user would periodically connect their computer to a remote site and upload the data file. Although this process provides some information, it does have some drawbacks. One drawback is that only user interaction that has specific instrumentation code is written out to a data file. For example, if a save button is used but no instrumentation code has been provided for writing to a data file, then this data is not written out to a data file and the software developers are unaware of the user's actions. Another drawback is that the instrumentation code added to the source code of the application may add bugs to the source code and cause problems. Still another drawback is that the instrumentation code may make the software application larger and may make it run slower.

In the past, Internet and dot-corn companies have collected user data using server logging to paint a full picture of feature usage, such as for websites. However, this data collection requires a user interaction with a web server to track the user interaction and does not function when collecting data on client-installed software usage.

SUMMARY OF THE INVENTION

In different embodiments, the invention is a method and system for tracking client software use. User data, specifically user interaction with a client-installed software application, may be collected in data files and the data files may be dynamically uploaded over a global computer system, such as the Internet, to a remote analysis system. The data files may be parsed for on-going analysis of feature usage. Typically, for any action that a user performs in the software application, several items are recorded in a data file such as a user identification, an absolute time-stamp, the method invoked (such as keyboard, mouse, etc.) including application source (if the software application includes more than one application), and details such as the dialog invoked, button pressed, menu used, menu item selected, application launch, application termination, as well as environment variables, such as operating system, screen resolution, etc.

That the invention improves over the drawbacks of the prior art and accomplishes the advantages described above will become apparent from the following detailed description of the exemplary embodiments and the appended drawings and claims.

DETAILED DESCRIPTION OF EMBODIMENTS OF THE INVENTION

In one embodiment, the present invention pertains to a method of collecting user data, specifically user interaction with a client-installed software application, through the dynamic upload of data files over a global computer network, such as the Internet. Files that contain data on software usage are dynamically uploaded to a remote analysis site and parsed for on-going analysis of feature usage.

In one embodiment, the present invention has the ability to log user actions within the software application. For any action that a user performs in the software application, several items may be recorded in a data file such as a user ID, an absolute time-stamp, the method invoked (keyboard, mouse, etc.) including application source (if the software application includes more than one application), and details such as the dialog invoked, button pressed, menu used, menu item selected, application launch, application termination, as well as environment variables, such as operating system, screen resolution, etc.

To enable logging within the application program module, the user, in one embodiment of the present invention, agrees to have their actions monitored in exchange for an incentive (such as free software) and submits a survey that may collect demographic information about that user. If accepted to the study, the user receives a copy of the software application, as well as a set-up program that sets up the study on the users machine(s).

Having briefly described the present invention, a description of an exemplary operating environment for an embodiment of the present invention will be described below in reference to FIG. 1.

Exemplary Operating Environment

Figure 1:
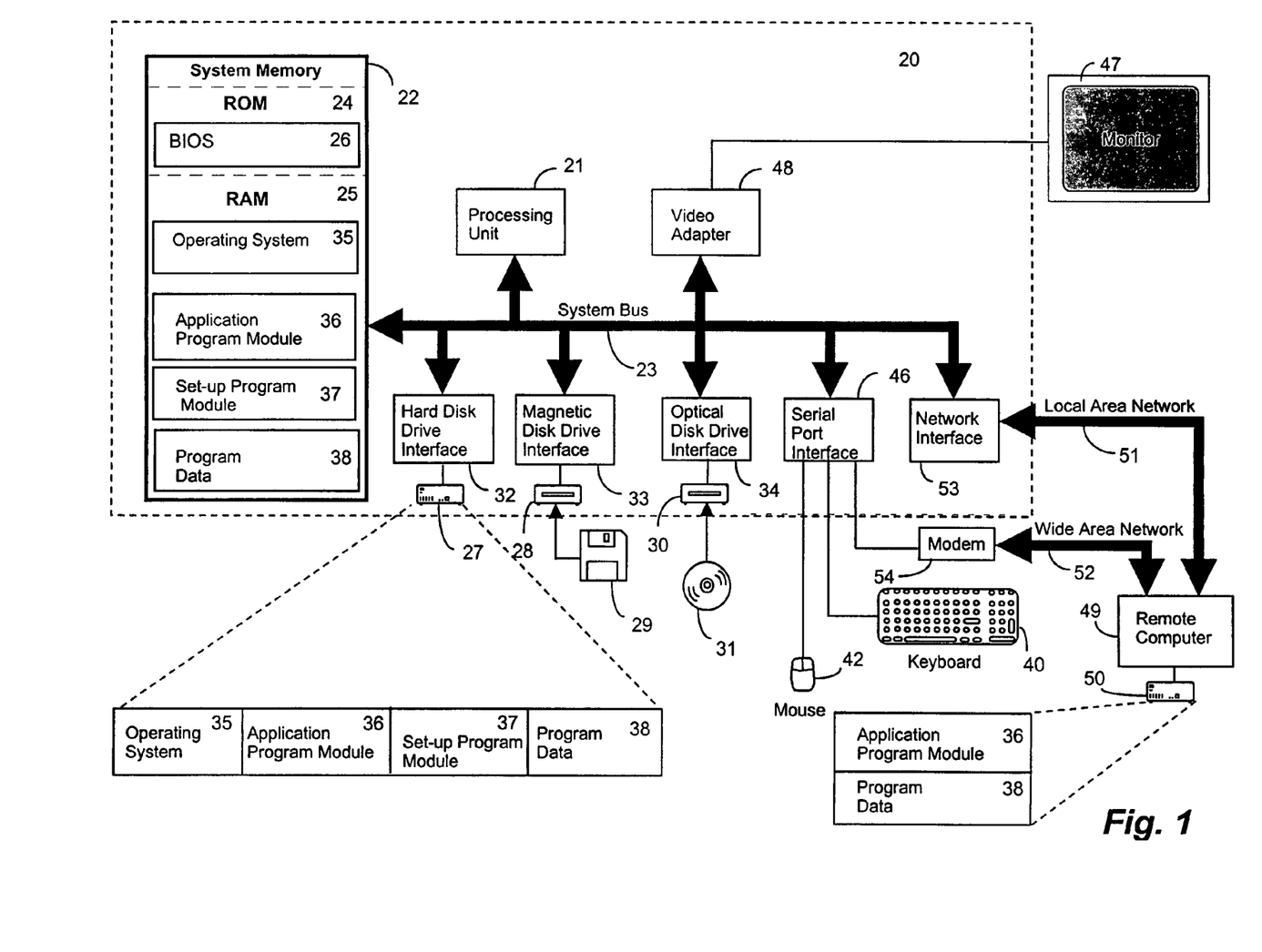
FIG. 1 is a block diagram of an exemplary computer system for implementing the invention.

FIG. 1 and the following discussion are intended to provide a brief, general description of a suitable computing environment in which the invention may be implemented. Although not required, the invention will be described in the context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. It should be further understood that the present invention may also be applied in the context of users accessing content on the Internet via a browser—so the present invention applies to much lower end devices that may not have many of the components described in reference to FIG. 1 (e.g., hard disks, etc.).

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS); containing the basic routines that help to transfer information between elements within the personal computer 20, such as during start-up, is stored in ROM 24.

The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28 and optical disk drive 30 are connected to the system bus 23 by a hard disk drive interface 32, a magnetic disk drive interface 33 and an optical drive interface 34, respectively. The drives and their associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, a set-up program module 37, and program data 38.

A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial port (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Method and System for Tracking Client Software Use

Figure 2:
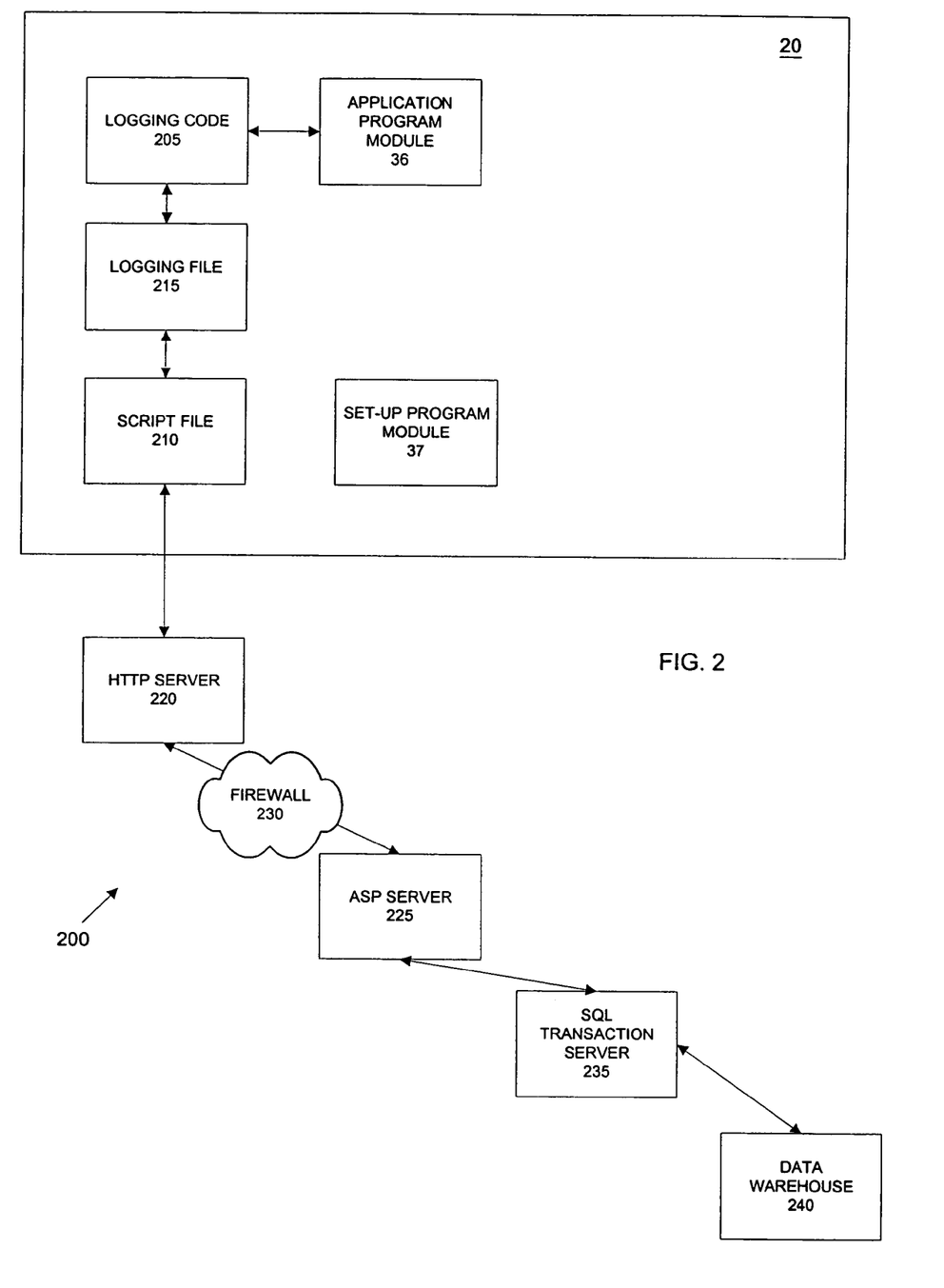
FIG. 2 is a block diagram illustrating an exemplary system for tracking client software use and analyzing client software use in accordance with an embodiment of the present invention.

Referring now to FIG. 2, an exemplary user interaction monitoring system for tracking client software use and a remote system for analyzing client software use (collectively system 200) in accordance with an embodiment of the present invention will be described. The system 200 includes a user's personal computer 20. One or more application program modules 36 to be tracked are stored in memory of the computer 20. A set-up program module 37 is also stored in memory of the computer 20.

Usually, a user agrees to be part of a study before the set-up program module 37 is downloaded to computer 20. If the user is accepted to the study, the user may receive incentives such as free software or free upgrades in exchange for allowing their software usage to be tracked. To begin the tracking process, the set-up program module is downloaded and started. The set-up program module installs logging code 205 and a script file 210 on computer 20. The logging code 205 is responsible for tracking the use of application program module 36 and writing out data records into a logging file 215. The script file 210 is responsible for periodically sending the logging file to a remote system for analysis.

In one embodiment, the remote system comprises a Hypertext Transfer Protocol (HTTP) server 220 that receives the logging files from the client's machine 20. The HTTP server 220 may be connected to an Active Server Pages (ASP) server 225 that is behind a firewall 230. The ASP server may be connected to a Structured Query Language (SQL) transaction server 235. The SQL transaction server 235 may be connected to a data warehouse 240 where the logging file 215 is eventually stored.

Figure 3:
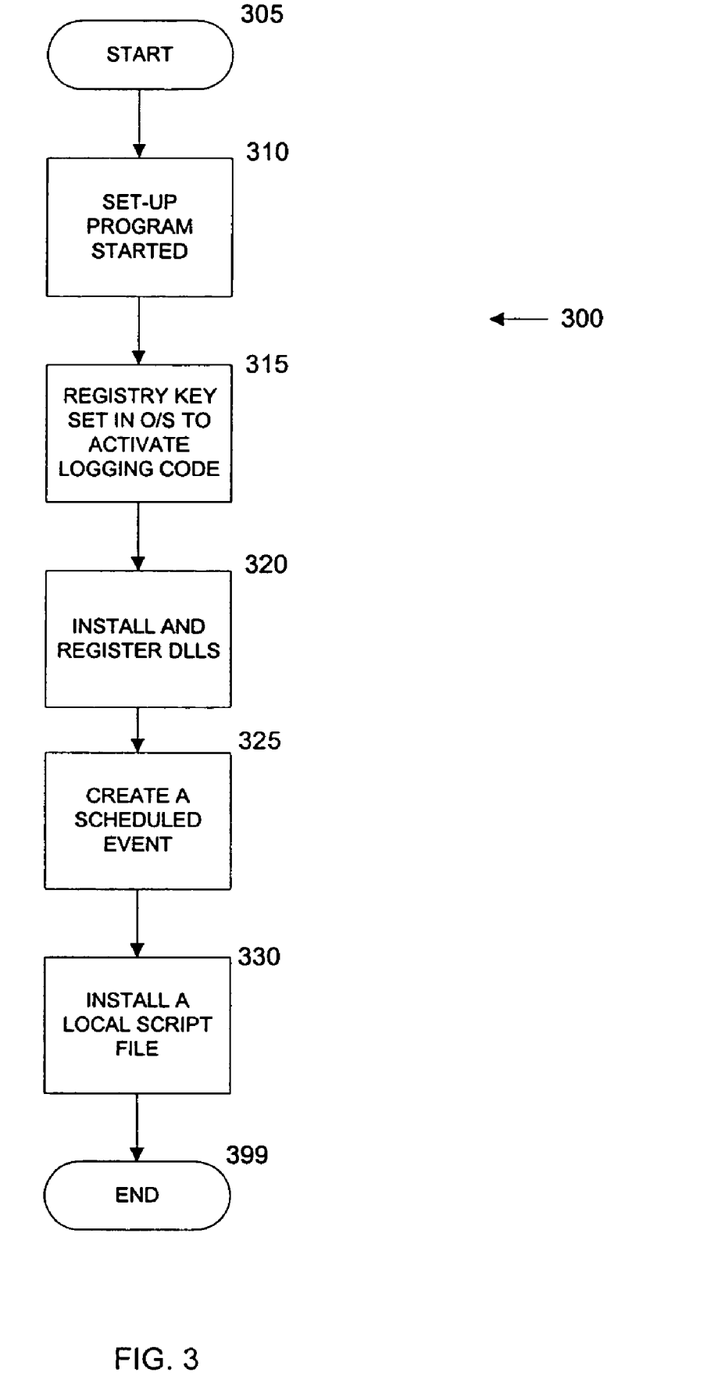
FIG. 3 is a flow diagram illustrating a method for installing a user interaction monitoring system in accordance with an embodiment of the present invention.

Referring now to FIG. 3, a flow diagram 300 illustrating a method for installing a user interaction monitoring system will be described. The method 300 begins at start step 305 and proceeds to step 310 where the set-up program module is started, such as by the user opening the set-up program module. As described above, the set-up program module may be shipped with the application program module to be monitored. Alternatively, the user may sign up to have their actions monitored and, if accepted to the study, the user may receive the application program module and set-up program module for installation on the user's computer 20. Once the user starts the set-up program module at step 310, the method 300 proceeds to step 315.

As part of the set-up, at step 315, the logging code 205 is installed in memory of the computer 20 and a registry key is set in the operating system 35 as an indicator to the application program that it should load the logging code. The logging code monitors the actions of the user and writes out records into a logging file 215 when the logging code recognizes actions by the user. After step 315, the method 300 proceeds to step 320.

At step 320, a plurality of dynamic link libraries (DLLs) are installed and registered on the user's computer 20. Typically, these DLLs are part of the logging code 205. These DLLs enable the decoding of user interactions to produce the logging file 215 on the user's computer 20. The actual code that performs the profiling of user actions is contained in the installed DLLs. When the application program being monitored loads, it checks the registry to see if profiling (monitoring of user actions) has been indicated. The registry key indicating this is set during the installation process (step 315). If profiling is indicated, the application program will attempt to load the DLLs and call an initialization function to start the profiling process.

At step 325, a scheduled event is created in a predetermined time period. For example, the scheduled event may be created at a random time somewhere between the predetermined time period of 1:00 A.M. and 4:00 A.M, when heavy use of the machine and Internet connection is less likely than other times. The scheduled event may be stored in a scheduled events folder and run at the appropriate time. The scheduled event may point to a local Visual Basic (VB) script file 210 which, when run, sends the logging file 215 to the remote analysis system.

At step 330, the local Visual Basic (VB) script file 210 is installed on the computer 20. The method 300 then ends at step 399. The user's interactions are ready for monitoring after the method 300 has been performed.

Figure 4:
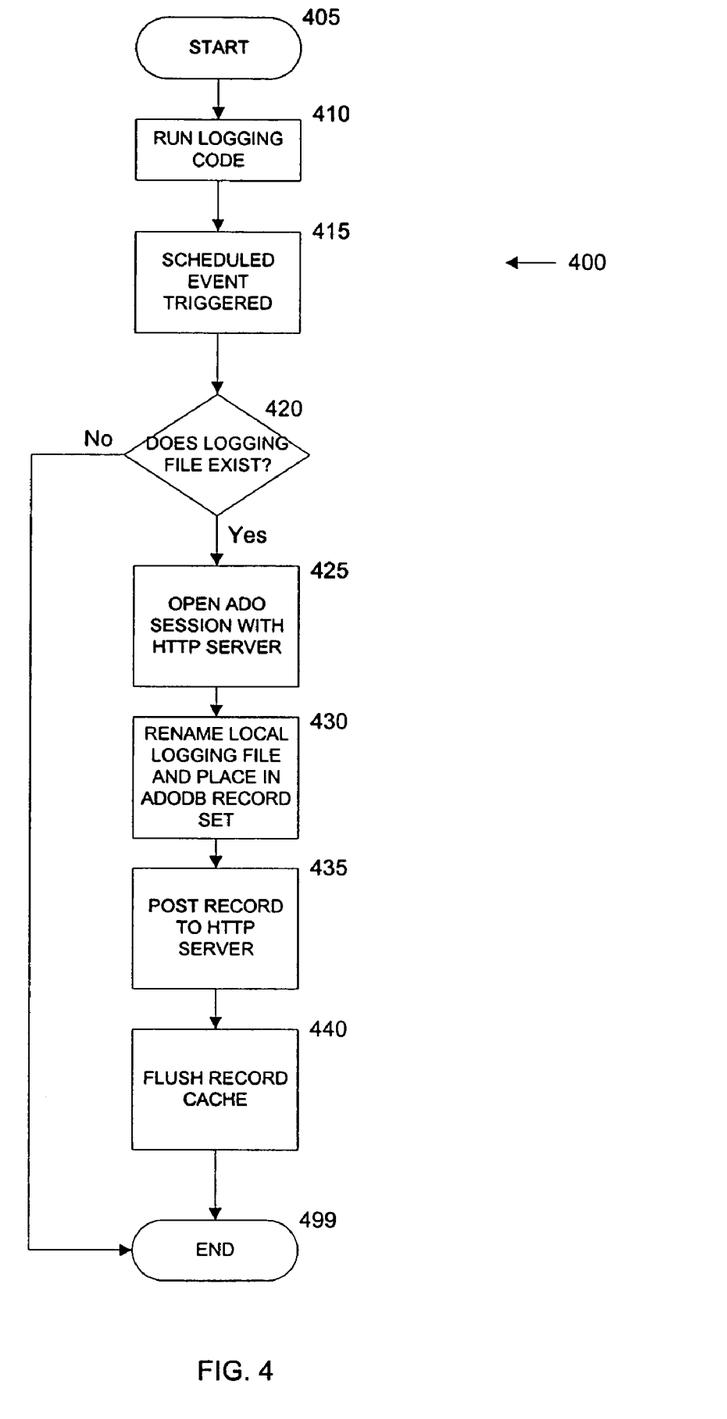
FIG. 4 is a flow diagram illustrating a method for logging user interactions with a software program module and transferring the logged data to a remote analysis system in accordance with an embodiment of the present invention.

Referring now to FIG. 4, a flow diagram 400 illustrating a method for logging user interactions with a software program module and transferring the logged data to a remote analysis system in accordance with an embodiment of the present invention will be described.

The method begins at start step 405 and proceeds to step 410 where the logging code 405 (including DLLs) is executed when the application program module 36 is started. The logging code 405 has a number of hooks into the operating system 35 and application program module 36 so that when a user interacts with the application program module 36 the logging code is notified with a hook (or other notification). The logging code 405 then is able to cross-reference the hook, using the installed DLLs, with a more specific action executed by the user. It should be understood that, in one embodiment, the logging code of the present invention implements a plurality of hooks. For example, keyboard hooks, user interface control hooks, mouse message hooks, etc. may be implemented so that the logging code is notified whenever one of these user interface controls is used. Given a particular hook, the logging code uses the DLLs to determine which particular window handle the hook points to. Then, such as by using a best fit algorithm, it can be determined which object (window) and element (such as command bars, dialogs, task panes, etc.) the window handle is associated with.

In one embodiment of the invention, hooks function as follows. The logging code, i.e., profiling code, uses an operating system application programming interface (API) such as "SetWindowsHookEx" which allows the logging code to monitor all messages or "events" that occur when a user interacts with the application program. For example, when a mouse button is clicked on a control in the application program user interface, the operating system sends an event message to the application program module to inform it of this event. The hook causes this event message to be routed first to the logging code, which gets an opportunity to inspect it, determine if it affects the application program user interface (UI) in a way that the logging code cares about, and collect information about the affected UI element. Once analyzed, the logging code dispatches the event message on to the application program.

The process of analyzing the event message is important. The event message references information about the "window handle" or user interface (UI) element that it relates to. The logging code interacts with the application program to determine what this UI element is. It typically collects data points that specify a numeric identifier for the UI element itself, and the identifier on the UI object that "contains" it. For example, the Save button is contained in the "Save As" dialog box. Identifiers are stored for both the button and the dialog box. The logging code contains code that filters these event messages in order to determine what UI elements the event messages refer to. Each different UI element "type" (button, list box, scroll bar, check box, etc) requires code that knows how to inspect that UI type and store the required identifiers mentioned above.

For each logged user interaction, data regarding the user identification, absolute time stamp, method invoked (such as keyboard, mouse, etc.), UI element identifier, UI object identifier and UI element type may be recorded in a record in the logging file 215. The method then proceeds to step 415.

At step 415, at the scheduled time (typically during the night or during some off-peak time) the scheduled event is triggered and the script file 210 is run.

At decision step 420, the script file determines whether the logging file exists and, if not, then the method ends at step 499. However, if the logging file does exist, then the method proceeds to step 425.

At step 425, an Active Data Object (ADO) session is opened with the HTTP server 220 of the remote analysis system through a local script file that is called by the scheduled event. It should be understood that, in a preferred embodiment, the session is an ADO session. However, in other embodiments, other file transfer methods may be used to transfer the logging file from the user's computer to the remote analysis system.

At step 430, the local binary logging file is renamed with a random number to prevent duplication in the HTTP server and the file is placed into a binary ADO database (ADODB) record.

At step 435, the ADODB record is posted to the HTTP server, such as by using the record.copy ADO method.

At step 440, the local binary logging file is deleted, i.e., the record cache for the local binary logging file is flushed. The method then ends at step 499.

Thus, as should be understood from the above-described method, the user operates the application program module normally and the logging file is automatically uploaded to the remote analysis system when the user's computer is on and the scheduled event occurs.

Figure 5:
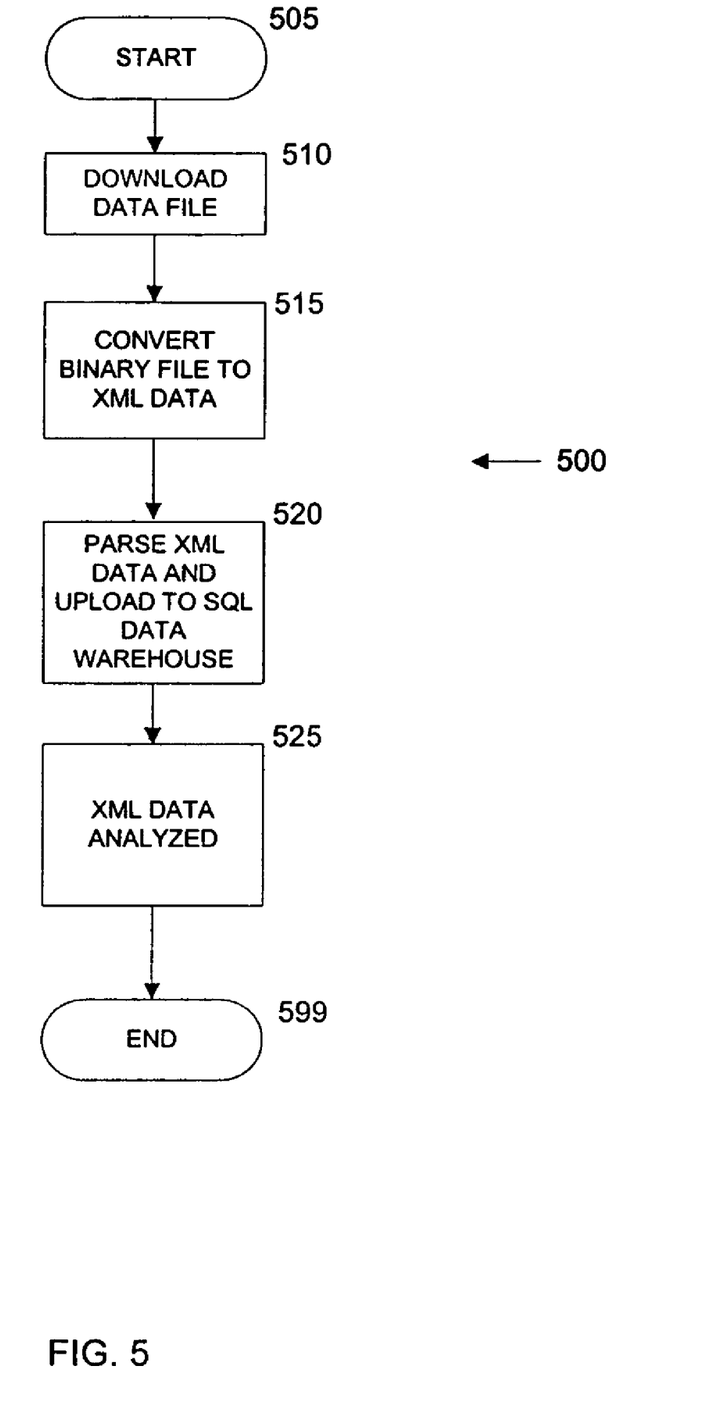
FIG. 5 is a flow diagram illustrating a method for analyzing the logging files at the remote analysis system in accordance with an embodiment of the present invention.

Referring now to FIG. 5, a flow diagram 500 illustrating a method for analyzing the logging files at the remote analysis system in accordance with an embodiment of the present invention will be described. The method begins at start step 505 and proceeds to step 510 where the logging files are downloaded from the HTTP server 220 to an Active Server Pages (ASP) server 225 behind a firewall 230.

The method then proceeds to step 515. At step 515, the binary logging files are converted to Extensible Markup Language (XML) data associated with a unique user identifier (to be able to associate particular data with particular users).

At step 520, the XML data is parsed and uploaded to the SQL data warehouse 240 associated with a SQL server 235. Parsing means that the various fields (such as identification, UI element identifier and time stamp) are converted to unique fields in a SQL table of the SQL data warehouse.

At step 525, the XML data is analyzed. For example, a web site implementing active server pages may connect to the SQL server and submit queries for specific usage questions and provide the results to the analysts. For example, some of the queries may be:

- How many users use specific features within the application program module and with what frequency
- Which areas of the application program module are undiscovered but used frequently by those who discover them
- Which areas of the application program module are never used, and should not be developed further
- What are the most-performed sequence of features used within the application program module.

Of course, the queries above are only examples and numerous other queries may be generated at step 525. At step 599, the method ends.

In other embodiments, the logging files may be converted back into client application actions so that the user's actions may be viewed and analyzed.

Figure 6:
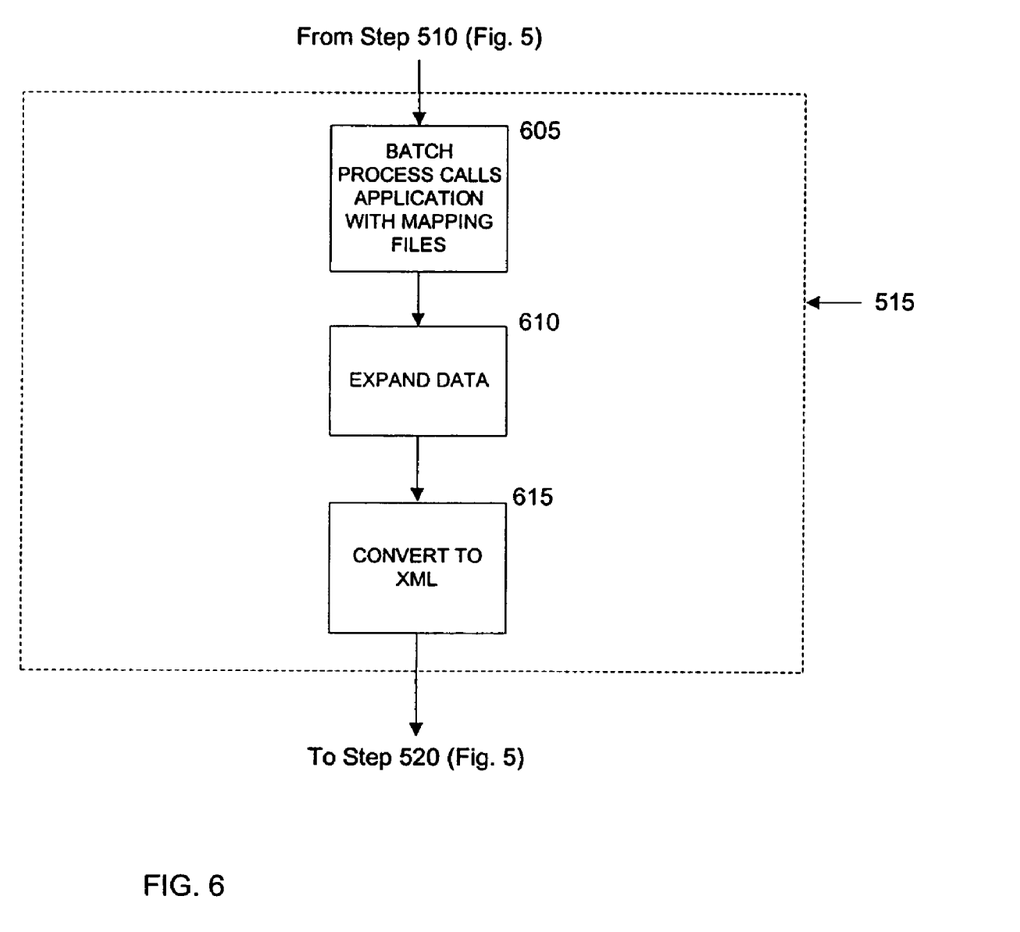
FIG. 6 is a flow diagram illustrating a method for converting the binary logging file to XML data in accordance with an embodiment of the present invention.

Referring now to FIG. 6, a flow diagram 600 illustrating a method for performing step 515 (converting the binary logging file to XML data) in accordance with an embodiment of the present invention will be described. At step 605, a batch process calls a mapping files application. The mapping files application, in a preferred embodiment, comprises a plurality of user interface (UI) mapping files that allows logging file data to be expanded to indicate a specific user interface element. For example, a user interface element may be identified by comparing the UI element identifier of the logging file with information in the UI mapping files. At step 610, the mapping files application expands the logging file data.

At step 615, the logging files data is converted to XML. The XML data is then sent to step 520 (FIG. 5).

It should be understood that when the UI element has been identified (as described above at step 410 (FIG. 4)), a record is created and stored to a disk file with details such as the UI element identifier, a time stamp, the UI element type, and the method invoked. It is important to note however that UI elements are not specifically identified at step 410 in a preferred embodiment of the present invention. The identifiers stored in the record must be analyzed in post-processing steps (such as steps 605-615) to specifically identify UI elements. Thus, after the data is collected, it is compared to the information in the UI mapping files and the names of the UI elements are fully expanded once located.

Specifically identifying UI elements outside of the user's machine is important because it greatly reduces the amount of code installed on the user's machine, and helps to ensure privacy. The mapping files that allow the collected data records to be expanded to specifically identified controls are very large, around 500,000 bytes for every application to be profiled. By storing only the simple numeric identifiers of the UI elements and using the mapping files to resolve them during post-processing, the size of the set-up program is significantly reduced (for speedy downloading perhaps), the amount of disk space consumed on the user's computer is reduced, and the amount of code loaded into the computer's memory is reduced which improves performance.

The mapping files comprise information that "maps" the user interface of the application program. Every menu, toolbar, button, dialog, and dialog control may be listed in the mapping files. Each element listed includes the full textual name and the numeric identifier of the UI element that it applies to, as well as a reference to the UI object that "contains" it. This sets up a "child-parent" relationship. For example, the Main Menu contains the File menu, which contains the Save button. These are the same identifiers that the profiling code stored, allowing the data records to be cross-referenced with the mapping file and thus fully expanded.

The mapping files are a key part of the profiling system, and can require a great deal of effort to create for a large and complex application program module. It needs to describe every element of the applications program's UI to make the profiling data as useful as possible. It should be noted that since the logging code itself does not need the mapping file, the creation (or completion) of the mapping files can be deferred until needed. Additional UI elements can be added to it as desired. Until a record for a given UI element is created, a profile record that relates to that element will be unidentified upon processing.

It should be understood that the present invention provides an important temporal aspect to the analysis of user interaction. Because each data entry includes a time stamp, the sequence of user interaction may be reconstructed. This temporal aspect to the analysis is extremely important to determine what features may be mistakenly used. For example, if the temporal data shows that a feature is often used and then the feature is undone then it may illustrate that users are expecting the feature to do one thing and then realize that is does something else. In this case, the feature may be tweaked or better user training may be necessary.

It should also be understood that another use for an embodiment of the present invention is in the testing that is done during software development. By tracking the actions of testers using the software application, developers may be able to determine which areas of the software application have not been tested or have been tested insufficiently. For example, the data may show that the "Insert Table" feature has not been tested.

It should be understood that the foregoing pertains only to the preferred embodiments of the present invention, and that numerous changes may be made to the embodiments described herein without departing from the spirit and scope of the invention.

We claim:

1. A method for analyzing a logging file from a computer, wherein the logging file comprises a plurality of records corresponding to user interactions with a software application program module of the computer, the method comprising the steps of:
- downloading the logging file from the computer;
- converting the logging file to Extensible Markup Language (XML) data associated with a unique user identifier, wherein the step of converting the logging file to XML data comprises the steps of:
  - calling an application with a plurality of mapping files, wherein the mapping files are operative to expand the records in the logging file to indicate a specific user interface element, the mapping files comprising information that maps a user interface of the software application program module, the mapping files further comprising a list of elements, wherein each listed element includes a full textual name, a numeric identifier, and a reference to a user interface object containing the listed element, wherein only the numeric identifiers for the listed elements are stored on the computer, wherein the mapping files are used to resolve the numeric identifiers during post-processing operations to reduce a size of a set-up program on the computer, to reduce a disk space amount consumed on the computer, and to reduce an amount of code loaded into a memory of the computer, thereby improving computer performance;
  - expanding the records in the logging file; and
  - converting the records in the logging file to XML data;
- parsing the XML data and uploading the parsed XML data to a SQL data warehouse, wherein parsing the XML data comprises converting an identification field, a user interface element field, and a time stamp field into unique fields in an SQL table of the SQL data warehouse; and
- analyzing the XML data, wherein analyzing the XML data comprises:
  - submitting a plurality of queries to the data warehouse for specific usage questions, wherein the plurality of queries comprise:
    - a query for determining a number of users using specific features within the software application program module and a frequency of use with respect to the specific features;
    - a query for identifying undiscovered areas of the software application program module which are frequently used by users after the areas are discovered;
    - a query for identifying unused areas of the software application program module; and
    - a query for identifying a most-performed sequence of features used within the software application program module; and
  - receiving a plurality of the XML data from the data warehouse in response to the plurality of queries.

2. The method of claim 1 wherein the step of downloading the logging file from the computer comprises receiving an ADO database record set from the computer.

3. The method of claim 1 wherein the step of downloading the logging file from the computer comprises receiving transmissions via a global computer network connection.

4. The method of claim 1 wherein the querying and receiving steps are performed via an Active Server Pages (ASP) connection.

5. The method of claim 1 wherein the step of analyzing the XML data comprises converting the XML data to a plurality of user actions that correspond to the user interactions with the software application program module.

6. A computer system for analyzing a logging file, wherein the logging file comprises a plurality of records corresponding to user interactions with a software application program module of a client computer, the system comprising:
- a server computer comprising a memory for storing executable program code and a processor, functionally coupled to the memory, the processor being responsive to computer-executable instructions contained in the program code and operative to:
  - download the logging file;
  - convert the logging file to markup language data associated with a unique user identifier, wherein in converting the logging file to markup language data, the processor is further operative to:
    - call an application with a plurality of mapping files, wherein the mapping files are operative to expand the records in the logging file to indicate a specific user interface element, the mapping files comprising information that maps a user interface of the software application program module, the mapping files further comprising a list of elements, wherein each listed element includes a full textual name, a numeric identifier, and a reference to a user interface object containing the listed element, wherein only the numeric identifiers for the listed elements are stored on the client computer, wherein the mapping files are used to resolve the numeric identifiers during post-processing operations to reduce a size of a set-up program on the client computer, to reduce a disk space amount consumed on the client computer, and to reduce an amount of code loaded into a memory of the client computer, thereby improving client computer performance;
  - expanding the records in the logging file; and
  - converting the records in the logging file to the markup language data;
  - parse the markup language data and uploading the parsed markup language data to a SQL data warehouse, wherein parsing the markup language data comprises converting at least one of an identification field, a user interface element field, and a time stamp field into unique fields in an SQL table of the SQL data warehouse; and
  - analyze the markup language data.

7. The system of claim 6 wherein the processor, in downloading the logging file from the computer, is operative to receive an ADO database record set.

8. The system of claim 6 wherein the processor, in downloading the logging file, is operative to receive transmissions via a global computer network connection.

9. The system of claim 6 wherein the processor, in analyzing the markup language, is operative to:
- submit a plurality of queries to the data warehouse for specific usage questions, wherein the plurality of queries comprise at least one of:
  - a query for determining a number of users using specific features within the software application program module and a frequency of use with respect to the specific features;
  - a query for identifying undiscovered areas of the software application program module which are frequently used by users after the areas are discovered;
  - a query for identifying unused areas of the software application program module; and a query for identifying a most-performed sequence of features used within the software application program module; and receive a plurality of the markup language data from the data warehouse in response to the plurality of queries.

10. The system of claim 9, wherein the plurality of queries is submitted and the plurality of markup language data is received via an Active Server Pages (ASP) connection.

11. The method of claim 1, wherein the processor, in analyzing the markup language data, is operative to convert the markup language data to a plurality of user actions that correspond to the user interactions with the software application program module.

12. A computer-readable non-transitory storage medium comprising computer executable instructions which, when executed on a computer, will cause the computer to perform a method for analyzing a logging file from a computer, wherein the logging file comprises a plurality of records corresponding to user interactions with a software application program module of the computer, the method comprising the steps of:

downloading the logging file from the computer;

converting the logging file to markup language data associated with a unique user identifier, wherein the step of converting the logging file to markup language data comprises the steps of:

calling an application with a plurality of mapping files, wherein the mapping files are operative to expand the records in the logging file to indicate a specific user interface element, the mapping files comprising information that maps a user interface of the software application program module, the mapping files further comprising a list of elements, wherein each listed element includes a full textual name, a numeric identifier, and a reference to a user interface object containing the listed element, wherein only the numeric identifiers for the listed elements are stored on the computer, wherein the mapping files are used to resolve the numeric identifiers during post-processing operations to reduce a size of a set-up program on the computer, to reduce a disk space amount consumed on the computer, and to reduce an amount of code loaded into a memory of the computer, thereby improving computer performance;

expanding the records in the logging file; and converting the records in the logging file to the markup language data;

parsing the markup language data and uploading the parsed markup language data to a SQL data warehouse, wherein parsing the markup language data comprises converting at least one of an identification field, a user interface element field, and a time stamp field into unique fields in an SQL table of the SQL data warehouse; and analyzing the markup language data.

13. The computer-readable storage medium of claim 12, wherein downloading the logging file from the computer comprises receiving an ADO database record set from the computer.

14. The computer-readable storage medium of claim 12, wherein downloading the logging file from the computer comprises receiving transmissions via a global computer network connection.

15. The computer-readable storage medium of claim 12, wherein analyzing the markup language data comprises:

submitting a plurality of queries to the data warehouse for specific usage questions, wherein the plurality of queries comprise at least one of:

a query for determining a number of users using specific features within the software application program module and a frequency of use with respect to the specific features;

a query for identifying undiscovered areas of the software application program module which are frequently used by users after the areas are discovered;

a query for identifying unused areas of the software application program module; and a query for identifying a most-performed sequence of features used within the software application program module; and receiving a plurality of the markup language data from the data warehouse in response to the plurality of queries.

16. The computer-readable storage medium of claim 15, wherein submitting the plurality of queries and receiving the plurality of markup language data is performed via an Active Server Pages (ASP) connection.

17. The computer-readable storage medium of claim 12 wherein analyzing the markup language data comprises converting the markup language data to a plurality of user actions that correspond to the user interactions with the software application program module.

* * * * *